March 16, 1926.

J. ROBINSON 1,576,758

CONNECTER HEAD

Original Filed April 12, 1921

INVENTOR
Joseph Robinson,
BY Watson, Cait,
Morse & Grin
ATTORNEYS

Patented Mar. 16, 1926.

1,576,758

UNITED STATES PATENT OFFICE.

JOSEPH ROBINSON, OF NEW YORK, N. Y.

CONNECTER HEAD.

Application filed April 12, 1921, Serial No. 460,775. Renewed June 12, 1925.

*To all whom it may concern:*

Be it known that I, JOSEPH ROBINSON, a citizen of the United States, and a resident of New York, in the county and State of New York, have invented certain new and useful Improvements in Connecter Heads, of which the following is a specification.

The present invention relates to automatic train pipe connecter heads and particularly to heads in which the guides or wings are formed separately from the base and are secured thereto by suitable fastening means.

In my copending application, Serial No. 363,634, filed March 6, 1920, a connecter head is disclosed in which the base and wing portions are separately formed and rigidly secured together whereby the machining operations are greatly simplified, the cost of manufacture reduced, and a connecter head produced which is amply strong and efficient in operation. The present invention has for one object the improvement of the means for securing the guides to the base. Another object of the invention is to provide a connecter head in which the base is formed integral with a yoke shaped supporting member, obviating the use of securing devices for attaching these two parts and insuring a strong structure and one easily fabricated.
Other objects of the invention and advantages thereof will be apparent to those skilled in the art from the disclosure in the following specification and in the accompanying drawings.
In the drawings:

Figure 1:
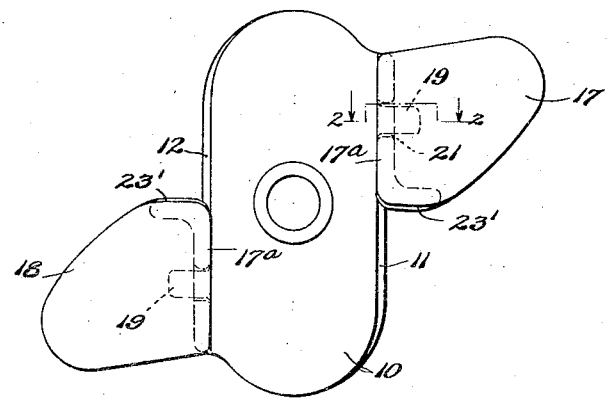
Fig. 1 is a front view of a train pipe connecter head having the improvements incorporated therein.
Figure 2:
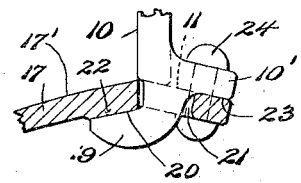
Fig. 2 is a section on line 2—2 of Figure 1.
Figure 3:
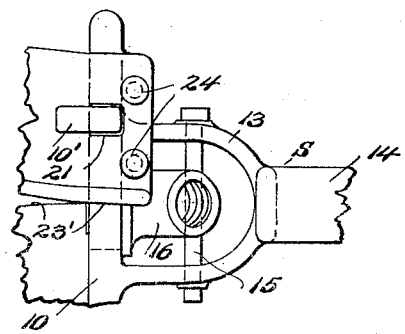
Fig. 3 is a side view of a portion of the head showing a support therefor.

The base of the head is indicated at 10 in the drawings, this base being preferably cast with rearwardly extending marginal flanges 10' and having its vertical side faces 11 and 12 inclined to the face, these faces being accurately machined to the desired inclination and dimensions. Formed integral with the base is a support S which is of the double yoke type described in my copending application, Serial No. 418,233, the arms of the forward yoke 13 merging into the rear of the base 10. This forward yoke is in a vertical plane while the rearward yoke 14 is in a horizontal plane. The arms of the yoke 13 have aligned apertures therein through which the pin 15 extends, this pin being adapted to be readily removed when desired. When in position it supports a train pipe fitting 16 which has its forward end within an aperture formed in the base 10. This manner of removably supporting the fitting is illustrated and described in my prior Patent 1,300,652, granted April 15, 1919.

The guides 17 and 18 are similarly formed and similarly secured to the base 10 and one securing means only will be described.

Projecting laterally from the side of base 10 is a prong 19 which has a forwardly directed portion with an inclined machined surface 20, and the guide 17 has an aperture 21 therein to receive the prong 19, this guide having an accurately machined surface 22 to bear against the inclined machined face of the prong and an accurately machined face 23 to bear against the edge 11 of the base. The faces 20, 22, 23 and 11 are so machined that the guide 17 will bear the proper angular relation to the base 10 when placed in position. To secure the guide to the base, rivets or other suitable fastening means 24 are employed these rivets passing through the guide adjacent its rear edge and through the rearwardly extending flange 10' of the base.

When the guides are formed separately it is possible to cast the head 10 and the support S integral, which is to be desired. Heretofore, with the guides and base formed integral it has been found impracticable to cast the base and support integral.

It will be observed that the inclined sides or faces 11 and 12 of the base 10 are preferably tapered to the same degree, and extend practically from one end of the head to the other, the guide 18 being secured to the lower portion of the inclined face 12 and the guide 17 being secured to the upper portion of the inclined face 11. By inclining these faces 11 and 12 to the same degree from practically one end of the base 10 to the other, the machining necessary to properly locate them with respect to the base 10, is greatly simplified since each of these faces can be machined in one operation and with the same tool.

It will also be observed that the opening 21 in the guides 17 and 18 is somewhat larger than the prong 19. This is to enable the guides to be adjusted to a master gauge when assembling them on the surfaces 11 and 12. When the guides are mounted on these surfaces and adjusted to this gauge they are rigidly clamped in the proper position, and the holes for the rivets 24 are then drilled through the guides and the marginal flanges 10'. In this way the guides are accurately positioned on the base 10', it being understood that the surfaces 23 of the guides are machined to the same inclination as the surfaces 11 and 12 of the base 10, and to a definite relation with respect to the inclined surfaces 17a and 23' of the guides, and that the guides are so positioned on the base 10 as to bring these surfaces into proper relation and position, preferably with the surfaces 23' disposed on approximately the transverse center line of the base 10. Of course the holes for the rivets 24 may be drilled before the guides 17 and 18 are assembled on the base 10, in which case it would be advisable to form them somewhat larger than the rivets to permit of the adjustment mentioned, and apply the rivets hot thus allowing them to be swelled or expanded to fill the holes.

Figure 4:
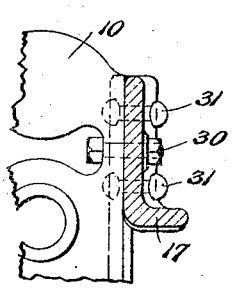
Fig. 4 is a section on line 4—4 of Figure 5;
Figure 5:
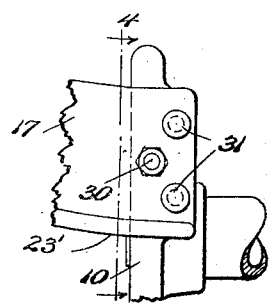
Fig. 5 is a side view of a portion of a connecter head showing a modified form of means for securing the guides to the base.

In Figures 4 and 5 a modification is illustrated in which, instead of the prongs 19, bolts 30 are used in addition to rivets 31 for securing the guides to the base. This construction has the advantage of requiring fewer machining operations in manufacture thereby rendering the device less expensive. Other modifications may be made within the scope of the invention.

Having thus described the invention what is claimed as new and desired to be secured by Letters Patent is:

1. In an automatic train pipe connecter head comprising in combination, a base and a support integral with said base, said support having a yoke shaped forward end, the forward ends of the arms of the yoke being integral with the rear portion of the base, and guides for said base, said guides being formed separately therefrom and rigidly secured thereto.

2. In an automatic train pipe connecter head, in combination, a base having a forwardly and inwardly inclined side wall, a prong extending laterally from the base and having a forwardly directed portion, and a guide member having an aperture to receive said prong, said guide member being inclined forwardly and outwardly relatively to the base but having a forwardly and inwardly inclined surface adjacent the aperture to abut against the inclined side wall of the base.

3. In an automatic train pipe connecter head, in combination, a base having a forwardly and inwardly inclined side wall, a prong extending laterally from the base and having a forwardly directed portion, and a guide member having an aperture to receive said prong, said guide member being inclined forwardly and outwardly relatively to the base but having a forwardly and inwardly inclined surface adjacent the aperture to abut against the inclined side wall of the base and having forwardly and outwardly inclined surface to bear against the inner surface of the prong.

4. In an automatic train pipe connecter head, in combination, a base, a prong extending laterally from the base and having a bearing surface facing toward the base, a guide member having an aperture to receive said prong and adapted to bear against the inner face of said prong and the side of the base, said aperture being larger than the prong to receive it with a loose fit so that the guide may be adjusted relatively to the base in assembling, and means for rigidly securing said base and guide together.

5. In an automatic train pipe connecter head in combination a base having a flange on each side extending longitudinally thereof, said flanges being inclined rearwardly and outwardly from the front face of said base, prongs extending laterally from opposite sides of said base each having a forwardly directed portion provided with an inner face, guide members mounted on opposite sides of said base each of said members having an aperture to receive one of said prongs and each comprising a front portion and a rear portion, the front portion of each of said guides having its rear side arranged to bear against the inner face of one of said prongs and having its rear portion arranged to bear against one of the flanges on said base, and means for securing the rear end of each of said guides to the adjacent flange on said base.

6. In an automatic train pipe connecter head, in combination, a base having a forwardly and inwardly inclined side wall, a prong extending laterally from said side wall, and a guide having an aperture to receive the prong and a surface to abut against the inclined side wall of the base.

In testimony whereof I hereunto affix my signature.

JOSEPH ROBINSON.